(12) United States Patent
Sasaki

(10) Patent No.: US 7,945,593 B2
(45) Date of Patent: May 17, 2011

(54) DIAGRAM CREATION DEVICE AND PROGRAM FOR THE SAME

(75) Inventor: Hirobumi Sasaki, Tokyo (JP)

(73) Assignee: I-N Information Systems, Ltd., Tokyo (JP)

(*) Notice: Subject to any disclaimer, the term of this patent is extended or adjusted under 35 U.S.C. 154(b) by 388 days.

(21) Appl. No.: 11/519,030

(22) Filed: Sep. 12, 2006

(65) Prior Publication Data

US 2007/0162483 A1    Jul. 12, 2007

(30) Foreign Application Priority Data

Jan. 12, 2006 (JP) ................................. 2006-004987

(51) Int. Cl.
G06F 7/00 (2006.01)
G06F 17/30 (2006.01)

(52) U.S. Cl. .................................................. 707/802

(58) Field of Classification Search .................. None
See application file for complete search history.

(56) References Cited

U.S. PATENT DOCUMENTS

| | | | | |
|---|---|---|---|---|
| 4,989,141 A * | 1/1991 | Lyons et al. | ................ | 705/36 R |
| 5,293,615 A * | 3/1994 | Amada | .............................. | 707/4 |
| 5,657,437 A * | 8/1997 | Bishop et al. | ................. | 715/203 |
| 5,819,102 A * | 10/1998 | Reed et al. | ....................... | 712/34 |
| 6,341,292 B1 * | 1/2002 | Cho et al. | ....................... | 707/203 |
| 2004/0111666 A1 * | 6/2004 | Hollcraft | ........................ | 715/503 |

FOREIGN PATENT DOCUMENTS

| | | |
|---|---|---|
| EP | 1 164 502 A2 | 12/2001 |
| JP | 2001-265311 | 9/2001 |
| WO | WO 03/007118 A2 | 1/2003 |

OTHER PUBLICATIONS

Pendse, N., "OLAP Omnipresent", [Online] Url:http://www.byte.com/art/9802/sec6/art7.htm [retrieved on 2002-12-09], section "Spreadsheet OLAP Clients", pp. 4-5.
European Search Report issued Jun. 19, 2009 in the corresponding European patent application (EP application No. 06020251.2).

* cited by examiner

*Primary Examiner* — Pierre M Vital
*Assistant Examiner* — Rachel J Lee
(74) *Attorney, Agent, or Firm* — Staas & Halsey LLP

(57) ABSTRACT

The diagram creation device ensures a good response irrespective of the volume of data while realizing a wide variety of display modes of figures or tables based on data acquired from a database. The function treating section of the diagram creation device returns a data produced by a content of an instruction input into a cell of a worksheet of a spreadsheet soft. The data treating section acquires data specified by a function and an entire time-series data having a code which forms argument of the function from a local database and then stores into a data caching section. The data acquired from the local database are computed to produce a computed data and stored into a computed data caching section. When data specified by the function exists within the data caching section or a computed data caching section, the data treating section preferentially acquires them.

16 Claims, 11 Drawing Sheets

FIG.2A

Attribute Information Table

| Code | Name | Unit | Source | Initial time | Latest time |
|---|---|---|---|---|---|
| LAF&URS | Jobless rate Seasonally adjusted value Men&Women Total | % | "Summary of labor force survey (Flash report)" by the Ministry of Internal Affairs and Communications | 1953/01 | 2005/10 |
| TOPIX | Tokyo Stock Price Index | January 4,1968 =100 | "Tokyo Stock Exchange Stock Price Index/ Average Stock Price" Tokyo Stock Exchange | 1950/01 | 2005/11 |
| I04060PDQ | Vehicle production quantity | Unit | "Statistical reports in machine industry" by the Ministry of Economy, Trade and Industry | 1980/01 | 2005/11 |
| IMJSLD0011 | Domestic sales of air conditioner on a product-by-product basis at large scale electric stores | Unit | Nippon Electric Big-store Association "NEBA newsletter" | 1998/04 | 2005/07 |

Numerical data table  20b

| Code | LAF&URS |
|---|---|
| ⋮ | ⋮ |
| 1998/04 | 139,613 |
| 1998/05 | 265,869 |
| 1998/06 | 331,871 |
| 1998/07 | 698,904 |
| 1998/08 | 305,797 |
| 1998/09 | 92,672 |
| 1998/10 | 63,503 |
| 1998/11 | 78,169 |
| 1998/12 | 82,044 |
| 1999/01 | 56,580 |
| 1999/02 | 99,541 |
| 1999/03 | 101,057 |
| 1999/04 | 122,077 |
| ⋮ | |
| 2004/07 | 646,397 |
| 2004/08 | 238,374 |
| 2004/09 | 96,956 |
| 2004/10 | 67,628 |
| 2004/11 | 78,634 |
| 2004/12 | 98,589 |
| 2005/01 | 70,258 |
| 2005/02 | 84,231 |
| 2005/03 | 100,035 |
| 2005/04 | 102,688 |
| 2005/05 | 177,156 |
| 2005/06 | 409,301 |
| 2005/07 | 567,036 |
| ⋮ | ⋮ |

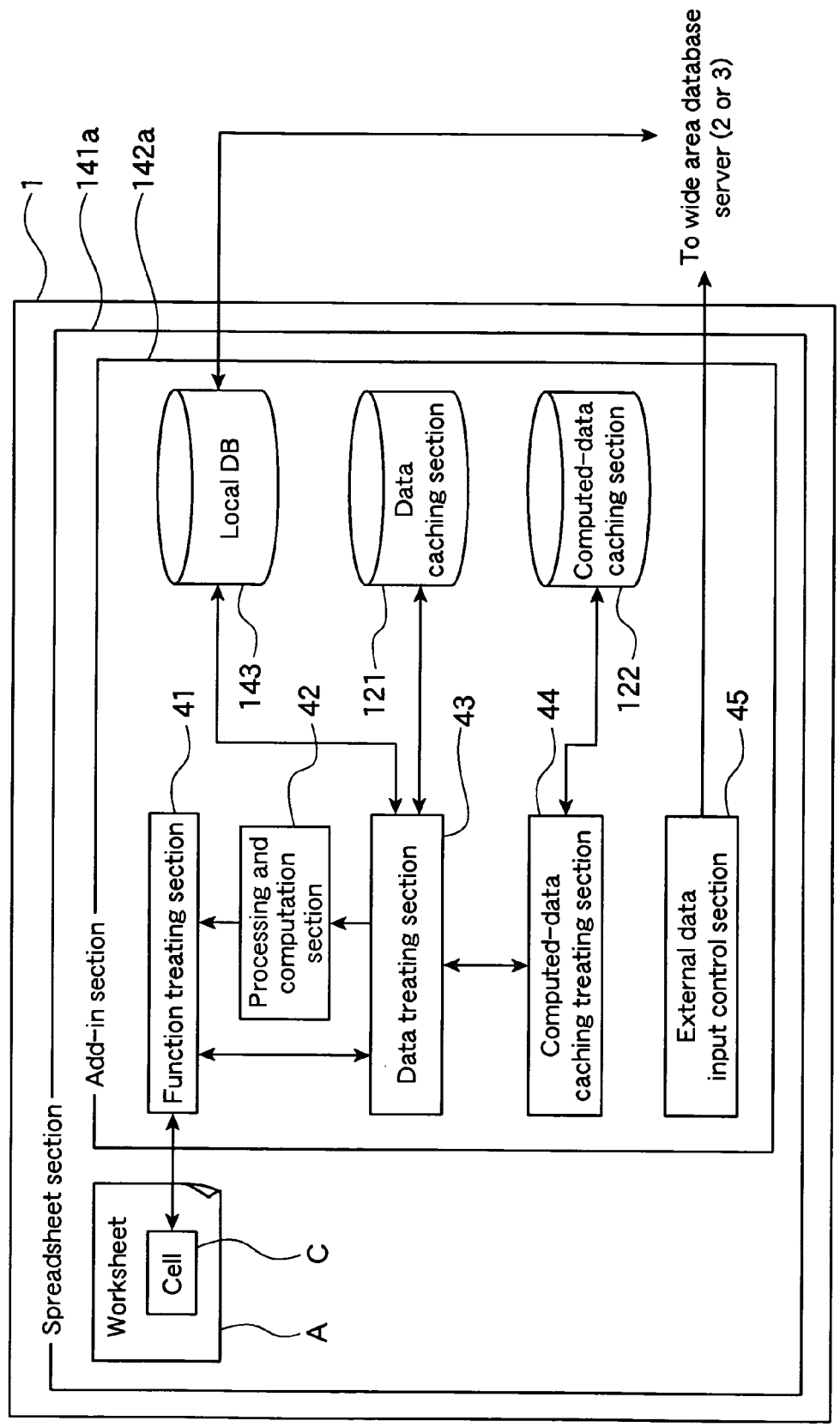

FIG.4

Time-series data table (Data caching table)
(121b1)

| Code | LAF&URS |
|---|---|
| Name | Domestic sales of air conditioner |
| Unit | % |
| Source | Nippon Electric Big-store Association "NEBA newsletter" |
| Initial time | 1998/04 |
| Latest time | 2005/07 |
| 1998/04 | 139,613 |
| 1998/05 | 265,869 |
| 1998/06 | 331,871 |
| 1998/07 | 698,904 |
| 1998/08 | 305,797 |
| 1998/09 | 92,672 |
| 1998/10 | 63,503 |
| 1998/11 | 78,169 |
| 1998/12 | 82,044 |
| 1999/01 | 56,580 |
| 1999/02 | 99,541 |
| 1999/03 | 101,057 |
| 1999/04 | 122,077 |
| : | |
| 2004/07 | 646,397 |
| 2004/08 | 238,374 |
| 2004/09 | 96,956 |
| 2004/10 | 67,628 |
| 2004/11 | 78,634 |
| 2004/12 | 98,589 |
| 2005/01 | 70,258 |
| 2005/02 | 84,231 |
| 2005/03 | 100,035 |
| 2005/04 | 102,688 |
| 2005/05 | 177,156 |
| 2005/06 | 409,301 |
| 2005/07 | 567,036 |

| Time scale | Month |
|---|---|
| Change of time scale | Total |

FIG.5

Computed-data caching table

| Code | LAF&URS |
|---|---|
| Name | Seasonally Adjusted ADD Domestic sales of air conditioner |
| Unit | % |
| Source | Nippon Electric Big-store Association "NEBA newsletter" |
| Initial time | 1998/04 |
| Latest time | 2005/07 |
| 1998/04 | 210,298 |
| 1998/05 | 229,483 |
| 1998/06 | 152,513 |
| 1998/07 | 203,314 |
| 1998/08 | 194,411 |
| 1998/09 | 187,467 |
| 1998/10 | 193,875 |
| 1998/11 | 192,916 |
| 1998/12 | 183,553 |
| 1999/01 | 190,763 |
| 1999/02 | 196,112 |
| 1999/03 | 179,785 |
| 1999/04 | 193,857 |
| : | : |
| 2004/07 | 188,548 |
| 2004/08 | 118,753 |
| 2004/09 | 197,001 |
| 2004/10 | 195,047 |
| 2004/11 | 185,915 |
| 2004/12 | 192,695 |
| 2005/01 | 195,148 |
| 2005/02 | 183,181 |
| 2005/03 | 179,906 |
| 2005/04 | 173,730 |
| 2005/05 | 160,743 |
| 2005/06 | 197,041 |
| 2005/07 | 115,054 |

| Time scale | Month |
|---|---|
| Change of time scale | Total |

FIG.9

| | B | C | D | E | F |
|---|---|---|---|---|---|
| 2 | コード | IMUSLD0011 | IMUSLD0011/add | IMUSLD0011 | IMUSLD0011/add |
| 3 | 値種別 | 原数値 | 原数値 | 前年比 | 前期比 |
| 4 | 名称 | 大型電気店商品別販売台数全国エアコン | 大型電気店商品別販売台数全国エアコン ADD | 大型電気店商品別販売台数全国エアコン | 大型電気店商品別販売台数全国エアコン ADD |
| 5 | 出典 | 日本電気大型店協会「NEBA会報」 | 日本電気大型店協会「NEBA会報」 | 日本電気大型店協会「NEBA会報」 | 日本電気大型店協会「NEBA会報」 |
| 6 | 単位 | 台 | 台 | 台 | 台 |
| 7 | 最新期 | 2005/07 | 2005/07 | 2005/07 | 2005/07 |
| 8 | 標準偏差 | 183,032 | 48,137 | 183,032 | 48,137 |
| 9 | 暦年 | | | | |
| 10 | 2000/12 | 2,418,334 | 2,416,947 | 10.44 | 10.42 |
| 11 | 2001/12 | 2,738,558 | 2,737,667 | 13.24 | 13.27 |
| 12 | 2002/12 | 2,430,461 | 2,429,819 | -11.25 | -11.24 |
| 13 | 2003/12 | 2,122,944 | 2,123,257 | -12.65 | -12.62 |
| 14 | 2004/12 | 2,180,880 | 2,181,136 | 2.73 | 2.73 |
| 15 | 2005/12 | #N/A | #N/A | #N/A | #N/A |
| 16 | 四半期 | | | | |
| 17 | 2002/12 | 245,547 | 580,847 | 0.70 | -18.99 |
| 18 | 2003/03 | 269,160 | 573,644 | 1.72 | -1.24 |
| 19 | 2003/06 | 705,733 | 557,191 | -0.03 | -2.97 |
| 20 | 2003/09 | 908,382 | 421,556 | -25.20 | -24.34 |
| 21 | 2003/12 | 239,669 | 570,866 | -2.39 | 35.42 |
| 22 | 2004/03 | 239,817 | 542,931 | -10.90 | -4.89 |
| 23 | 2004/06 | 714,485 | 560,247 | 1.24 | 3.19 |
| 24 | 2004/09 | 981,727 | 504,302 | 8.07 | -9.99 |
| 25 | 2004/12 | 244,851 | 573,657 | 2.16 | 13.75 |
| 26 | 2005/03 | 254,524 | 558,235 | 6.13 | -2.69 |
| 27 | 2005/06 | 689,145 | 531,513 | -3.55 | -4.79 |
| 28 | 2005/09 | #N/A | #N/A | #N/A | #N/A |
| 29 | 月次 | | | | |
| 30 | 2004/04 | 102,933 | 175,010 | -18.79 | 2.95 |
| 31 | 2004/05 | 199,468 | 184,921 | -8.55 | 5.66 |
| 32 | 2004/06 | 412,084 | 200,317 | 14.19 | 8.33 |
| 33 | 2004/07 | 646,397 | 188,548 | 61.43 | -5.88 |
| 34 | 2004/08 | 238,374 | 118,753 | -30.95 | -37.02 |
| 35 | 2004/09 | 96,956 | 197,001 | -40.43 | 65.89 |
| 36 | 2004/10 | 67,628 | 195,047 | 3.39 | -0.99 |
| 37 | 2004/11 | 78,634 | 185,915 | 0.65 | -4.68 |
| 38 | 2004/12 | 98,589 | 192,695 | 2.55 | 3.65 |
| 39 | 2005/01 | 70,258 | 196,148 | 17.06 | 1.27 |
| 40 | 2005/02 | 84,231 | 183,181 | -4.17 | -6.13 |
| 41 | 2005/03 | 100,035 | 179,906 | 8.85 | -1.79 |
| 42 | 2005/04 | 102,688 | 173,730 | -0.24 | -3.43 |
| 43 | 2005/05 | 177,156 | 160,743 | -11.19 | -7.48 |
| 44 | 2005/06 | 409,301 | 197,041 | -0.68 | 22.58 |
| 45 | 2005/07 | 562,024 | 115,054 | -12.20 | -41.61 |

DIAGRAM CREATION DEVICE AND PROGRAM FOR THE SAME

BACKGROUND OF THE INVENTION

1. Field of the Invention

The present invention relates to a technology for acquiring, processing and storing various data stored in a database using, what is called, spreadsheet software.

2. Prior Art of the Invention

There has been a database service for collecting and accumulating a large volume of data in a specific area such as economic statistics data, and for providing users with such data through Internet etc. This database service includes providing what is called time-series data (which hereinafter means a numerical data group observed or produced over the course of time or attribute information of the numerical data group: that is, for example, data such as changes in the sales of a product or changes in a specific stock price with time). The data obtained by the users of the database are processed and computed if necessary and utilized as graphs or tables.

In a conventional technique, there is also a technology for obtaining data from the database service by using a computer terminal and for displaying these data on a display screen as graphs or tables by writing out the data acquired on a software for database access (for example unexamined Japanese patent publication JP2001-265311A).

Data, especially time-series data provided from the database service generally have a large volume of data, and it is often the case that data to be displayed can not be given until a predetermined computation is carried out for all original data obtained from the database (as is the case for displaying a seasonally-adjusted value).

The above-mentioned patent realizes a short response time because computation for all original data can be completed by one computation process irrespective of the number of data. There is, however, a drawback or inconvenience in this technology. That is, variation or display mode is limited so that the users could not be fully satisfied with the technology who want to get a wide variety of display patterns.

To solve these drawbacks, there is another method for obtaining data through direct access to the database from a cell of spreadsheet software (hereinafter referred to "spreadsheet soft") and then displaying them on the display screen. However, according to this method, computation is carried out individually for each data in each cell of the spreadsheet soft. Accordingly, in the case of the above-mentioned time-series data, if this method is applied for a case in which computation must be performed for all data at the time of producing each value to be displayed, time-consuming or hefty computation is needed, resulting in increasing in response time and being inconvenient.

SUMMARY OF THE INVENTION

The present invention is made to solve the above-mentioned problems. An object of the present invention is to provide a diagram creation device capable of ensuring a good response irrespective of the volume of data while realizing a wide variety of display modes of figures or tables based on data obtained from a database.

In view of the foregoing, the present invention relates to a diagram creation device which comprises:

instruction treating means for reading instruction data input in a cell on a worksheet of a spreadsheet soft, for decoding a content of the instruction and for returning data obtained based on the content of the instruction to the cell, data caching means formed on a memory for caching the data acquired from the database etc., and data acquisition means for acquiring specified data specified by the content of the instruction through searching the database or the data caching means for specified data based on the content of the instruction decoded by the instruction treating means, wherein the data acquisition means read a predetermined information contained within the specified data which is requested to acquire by the content of the instruction, acquire the specified data and data of the same series of the specified data which include the predetermined information in a data accumulated in the database, and store the specified data and the data of the same series into the data caching means, and the data acquisition means preferentially acquire the specified data in the data caching means when the specified data sought to be acquired by the content of the instruction exists within the data caching means.

Another aspect of the present invention is that the device further comprising;

processing and computation means for carrying out, based on the content of the instruction, a predetermined computation for the data acquired from the database and for producing computed data as a result of the computation; and computed-data caching means for caching the computed data, wherein the data acquisition means preferentially acquire the specified data from the computed-data caching means when the specified data sought to be acquired by the content of the instruction exists within the computed-data caching means.

Still another aspect of the present invention is that the data acquisition means preferentially acquire the data capable of producing the specified data from the data caching means rather than from the database when the specified data sought to be acquired by the content of the instruction does not exist within the computed-data caching means and the data capable of producing the specified data exists within the data caching means.

Another aspect of the present invention is that the instruction data that can be decoded by the instruction treating means is composed of a function operable on the spreadsheet soft and the predetermined data is the data to be acquired based on the function.

Another aspect of the present invention is that the function returns numerical data that forms time-series data or attribute information of the numerical data to the cell.

Another aspect of the present invention is to provide a program to make a computer operate as a diagram creation device having a feature described above.

According to the present invention described above, data caching means for caching various data acquired from the database etc. is formed on the memory. At the time of acquiring data based on the instruction data input into the cell of the worksheet of the spreadsheet soft, if the specified data sought to be acquired exist within the data caching means, the data acquisition means preferentially acquire the specified data in the data caching means, being able to reduce the number of access to the database and the costs of CPU in sending and receiving data to and from the database. Accordingly, response time can be reduced when the instruction data is input into the cell of the spreadsheet soft. High degree of freedom of display mode or style can be realized in creating graphs and/or tables based on the data acquired from the database and good response can be maintained irrespective of the volume of the data.

According to another aspect of the present invention, at the time of acquiring specified data from the database, the data of the same series of the specified data which contains a predetermined information of the data accumulated in the database are acquired and stored, along with the specified data, in the data caching means, so that the data of the same series of the data sought to be acquired from the database can be acquired from the data caching means. Accordingly, the number of access to the database for acquiring the data of the same series and the costs of CPU can be reduced. High degree of freedom of display mode in creating graphs and/or tables based on the data acquired from the database can be realized and good response can be maintained irrespective of the volume of the data.

According to still another aspect of the present invention, in addition to the effects mentioned above, the system produces computed data after computation of the data acquired from the database and caches the computed data into the computed-data caching means. The data acquisition means preferentially acquire the computed data which are cached, so that costs and processing-time for CPU to compute the numerical data necessary to return to the cell after a predetermined computation of the data acquired from the database can be reduced. Therefore, the response time can be shortened when the instruction data to acquire the numerical data produced by computation are input into the cell of the spreadsheet soft. High degree of freedom of display mode can be realized and better response can be maintained irrespective of the volume of the data.

According to another aspect of the present invention, in addition to the effects mentioned above, in the case where the specified data is the computed data and does not exist within the computed-data caching means and the data that can be formed into the specified data exists in the data caching means, the number of access to the database at the time of producing the computed data and the cost of CPU for sending and receiving the data to and from the database can be reduced by preferentially acquiring the data from the data caching means. Therefore, when the instruction data for acquiring the numerical data to be produced by computation is input into the cell of the spreadsheet soft, response time for the numerical data to be returned to the cell can be shortened. High degree of freedom in display mode can be realized and good response can be maintained irrespective of the volume of the data.

According to another aspect of the present invention, in addition to the effects mentioned above, by letting the instruction data be operable on the spreadsheet soft, the functions of the present invention and the ordinary functions of the spreadsheet soft can be parallely used without trouble by making the instruction data be operable on the spreadsheet soft. Accordingly, the present invention can be used for improving the convenience of the spreadsheet soft. When the format of the instruction data is written in the form of "function" like an ordinary instruction data for spreadsheet software, it is possible to make users of the system who input the instructions into the cell input the instruction data with ease, enhancing the convenience of the system for users who use the present invention on the spreadsheet soft. Furthermore, graphs and/or tables can be created based on functions so that style or mode of these figures and tables can be easily changed into another display mode by changing the argument, enhancing freedom of figure and/or table creation.

According to another aspect of the present invention, in addition to the effects mentioned above, the present invention can be used for creating graphs and/or tables of economic information or statistical information etc. by returning numerical data that forms time-series data or attribute information of the time-series data to the cell by the function. In creating graphs or tables in such an area of the present invention where large volume of data are processed, excellent response can be maintained while realizing high degree of freedom in display mode.

According to another aspect of the present invention, the present invention can be realized on various computer hardware.

BRIEF DESCRIPTION OF THE DRAWINGS

FIGS. 2A and 2B are image diagrams showing an attribute information table and a numerical data table, respectively;

FIG. 3 is a functional block diagram showing a diagram creation device of the present invention;

FIG. 4 is an image diagram showing a time-series data table (data caching table) in FIG. 3;

FIG. 5 is an image diagram showing a computed-data caching table in FIG. 3;

FIG. 9 is an image diagram of a worksheet in which a completed version of table is displayed.

DETAILED DESCRIPTION

The preferred embodiments of the present invention will be described with reference to the accompanying drawings.

Figure 1:
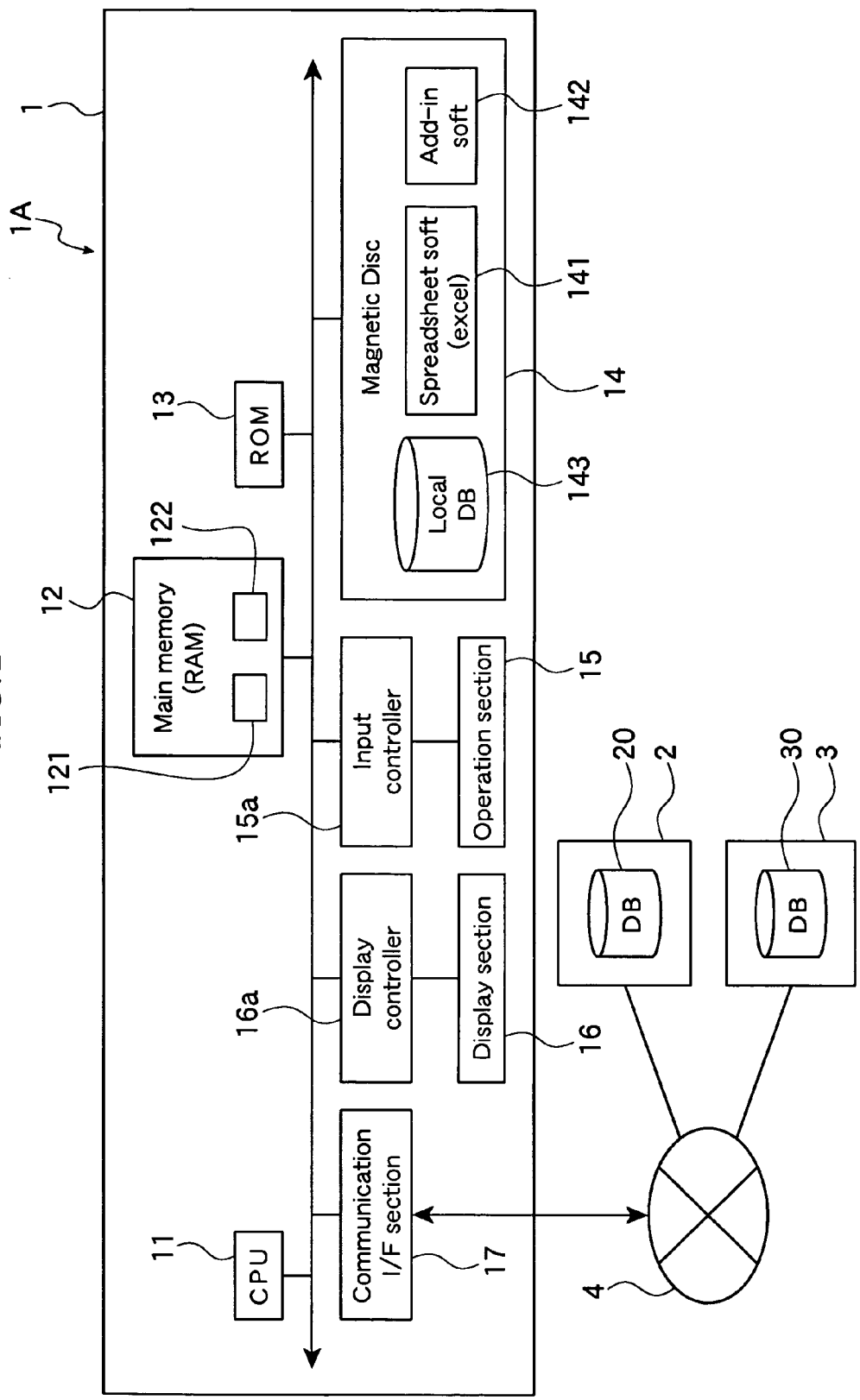
FIG. 1 is a block diagram showing a configuration of a diagram creation system of the present invention.

FIG. 1 is a block diagram showing a configuration of a diagram creation system of the present invention. As shown in FIG. 1, the diagram creation system 1A is comprised of a diagram creation device 1, a first database server 2 and a second database server 3, which are operatively connected to the internet 4 for communication.

The diagram creation device 1 is represented by a general computer such as a personal computer, a Personal Digital Assistant (PDA) etc. and is provided with a CPU 11, a main memory (RAM) 12, ROM 13, a magnetic disc 14, an input controller 15, a display controller 16, a communication interface section 17, which are bus-connected. The first database server 2 is provided with a first wide area database, and the second database server 3 is provided with a second wide area database 30.

The CPU 11 controls the diagram creation device 1 and runs various data processing based on description of a program stored in the ROM 13 by using the main memory 12 as a work area or space. The main memory 12 and the ROM 13 are used as storage medium. The main memory 12 is used as a work area of the CPU 11, and the ROM 13 is used as a storage area for a loading program. The magnetic disc 14 is used as a storage area for various application programs and database etc.

On the magnetic disc 14, OS (Operating System) program and an application program such as a spreadsheet soft 141 and an add-in soft 142 are stored. When the add-in soft 142 is processed at CPU 11, a local database 143 is formed in the magnetic disc 14, and a data caching section 121 and a computed-data caching section 122 are formed respectively in the main memory 12 (the spreadsheet soft 141, the add-in soft 142, the data caching section 121 and the computed-data caching section 122 will be explained later).

An input controller 15a conveys a message of operation made at an operation section 15 (keyboard, pointing device etc.) to the CPU 11. A display controller 16a makes a display section 16 such as LCD (Liquid Crystal Display) display a display data created by the CPU 11. The communication interface section 17 carries out a process necessary to send and receive data by way of the internet 4 based on a predetermined communication protocol.

The first wide area database 20 and the second wide area database 30 are databases usable through the internet 4 and store information which is owned and controlled by a database service company who provides economic statistic data. Data groups stored in the first wide area database 20 and the second wide area database 30 may be data owned and controlled by the same company or by respective separate companies.

In the first wide area database 20 (or the second wide area database 30), many attribute information tables 20a as shown in FIG. 2A or numerical data tables 20b as shown in FIG. 2B are stored. Each line of the attribute information table 20a forms attribute information of one of time-series data. And in the attribute information table 20a, attribute information (not shown) such as "kind of time scale" or "change of time scale" are included. In the numerical data table 20B, information that forms numerical data of time-series data is stored. "Attribute information", "numerical data", "kind of time scale" and "change of time scale" etc. will be explained later.

FIG. 3 is a functional block diagram of the diagram creation device 1 having above-mentioned configuration.

The diagram creation device 1 is composed of an executed results at the CPU 11 of the spreadsheet soft 141 and the add-in soft 142 stored in the magnetic disk 14. The spreadsheet soft 141 is a table creation software used for counting and analyzing a numerical data. In the present invention, "Excel" by Microsoft can be used but other spreadsheet software "Lotus 1-2-3 (registered trademark)" by IBM can also be used. The add-in soft 142 is a software to be added-in to the spreadsheet soft 141 (Add-in is an extended function to be added to an application soft). As shown in FIG. 3, the diagram creation device 1 is composed of a spreadsheet section 141a as an executed result of the spreadsheet soft 141 and the add-in section 142a which is an executed result of the add-in soft 142 and is workable on the spreadsheet section 141a.

The spreadsheet section 141a makes the display section 16 display a worksheet A and controls input and output of data with respect to a cell C.

The add-in section 142a is composed of a function treating section (instruction treating means) 41, processing and computation section (processing and computation means) 42, data treating section (data acquisition means) 43, computed-data caching treating section 44, external-data input controlling section 45, local database 143, data caching section (data caching means) 121, computed-data caching section (computed-data caching means) 122.

The function treating section 41 has a function of communicating data to and from the cell C, decoding a text-entry which is input into the cell C of the worksheet A (which will be explained later), executing instructions required by the function and returning a value to the cell C.

Based on an instruction of the function, the data treating section 43 has a function of acquiring data from the local database 143 and inputting and outputting data to and from the data caching section 121 etc.

The processing and computation section 42 has a function of executing a necessary processing and computation with respect to the data acquired by the data treating section 43 and of transferring them to the function treating section.

The computed-data-caching controlling section 44 has functions of executing computation with respect to data acquired from the local database 143 or the data caching section 121 according to instructions of the function, storing the computed data on the computed-data caching section 122 and controlling data accumulated on the computed-data caching section.

The external-data input controlling section 45 has functions of controlling input of data from a first and second database servers 2, 3 to the local database 143 according to input from the operation section 15.

The local database 143 is formed on the magnetic disk 14 and has a function of accumulating time-series data. "Time" of the time-series data includes clock or calendar time such as day, week, month, year and any time period such as quarter term, first half year etc. In addition, the attribute information represents data name such as "sales of a product", "trends in share prices", or data unit such as "%", "YEN" etc.

In the local database 143, data are stored in the form of table on a time-series data basis.

FIG. 4 is an image of the time-series data table 143a. FIG. 4 shows a time-series data table 143a of "domestic sales of air conditioner", which is composed of attribute information 143a1 and numerical data 143a2. Attribute information includes time scale data $143a1_1$ as information of time scale (day, month, year etc.) of each data and change of time scale data $143a1_2$ as information of the change of "time scale" according to the function. Numerical data 143a2 represents monthly sales of air conditioner. A large number of such tables are stored in the local database 143 on the time-series data basis.

The data caching section 121 and the computed-data caching section 122 are formed on the main memory 12.

On the data caching section 121, a data caching table, in which a table of raw data (data to be cached which is in the state acquired condition acquired from the local database 143, hereinafter the raw data will be used in the same meaning) is cached, is stored. The data caching table 121a is equal to respective time-series data table stored on the local database 143. That is, for example, the data caching table 121a of the "domestic sales of air conditioner" is equal, as shown in FIG. 4, to the time-series data table 143b. The data caching table 121a is stored in the data caching section 121.

On the other hand, in the computed-data caching section 122, the time-series data whose numerical data is a computed data (the computed data is a data produced from the data stored in the local database 143 through a predetermined computation and then stored, hereinafter the computed data will be used in the same meaning) is stored. FIG. 5 shows an image diagram of the computed-data caching table. The computed-data caching table 122a in FIG. 5 is a time-series data of "domestic sales of air conditioner" and is formed with attribute information 122a1 and numerical data 122a2. The attribute information includes time scale data $122a1_1$ and change of time scale data $122a1_2$. The numerical data 122a2 is formed on the basis of a seasonally-adjusted value (actual sales divided by seasonal index) of domestic monthly sales of air conditioner.

As described above, a function is text-input into the cell C of the worksheet A. This "function" is an instruction to execute a predetermined computation and then sends back the executed results (hereinafter called "value"). Each function has a function name comprising alphabets and a subsequent argument written in parenthesis. The "argument" is a value necessary to execute computation of the function and the necessary type of the argument is different from function to function. When a plurality of arguments are used, arguments are each separated by comma (,) and enumerated. Any function can be composed of cell reference (method of referring a value which is input into a specific cell by specifying the cell from an absolute position or relative position in the table) or a function itself as well as a constant as an argument. If there is a plurality of arguments, some of them can be skipped.

For example, in a function having a name of "INDBZ ("TOPIX", "NAME")", "INDBZ" is the name of function, and "TOPIX" and "NAME" are arguments.

Form and working function of the function can be expressed in great variety. In the present invention, "attribute acquisition function", "numerical calculation function" and "numerical value acquisition function to acquire numerical value at a specific time point" will be explained as representative examples.

Specifications of respective functions are as follows:

(1) Attribute Acquisition Function - - -

Format: INDBZ (code, attribute name)

The attribute acquisition function acquires attribute information (name, unit, source, initial time, ending time, etc.) of the specified (specific time series data) code. For example, the function "INDBZ ("topix", "name"))" acquires a name of a time-series-data having a code called TOPIX (Tokyo Stock Exchange Stock Price Index).

(2) Numeric Value Calculation Function - - -

Format: INDBC (code, calculation method, initial time, ending time)

The numeric value calculation function acquires an average value of all value during the entire period of a time-series data having a specified code.

For example, a function of "INDBC" ("topix", "average")" acquires an average value of all values during the entire period of a time-series data having a code named TOPIX.

(3) Numerical Value Acquisition Function at a Specific Time Point

Format: INDBS (code, time, calculation method - - - )

The numerical value acquisition function acquires a numerical value at a specified time point of a specified code, carries out a specified computation with respect to the acquired numerical value and then returns a computed result as a value. Type of computation includes, for example, "source numerical value", "quarter-on-quarter base", "moving average" and "change of time scale". A plurality of computation types can be used at the same time.

For example, a function of "INDBS ("topix", "1999/11", "year-on-year basis", "calendar year") carries out a computation of adding up monthly data (change of time scale) of TOPIX to produce year-on-year data in the year of 1999.

At a time of producing value through processing-and-computation of raw data, argument in the function decides whether the processing-and-computation is carried out at the processing-and-computation section 42 or at the computed-data caching processing section 44. More specifically, the decision is made by the presence or absence of an under bar " " in the first argument (the leftmost argument).

For example, the function of "INDBS ("topix", "2005/11", "year-on-year basis")" makes the processing-and-computation section 42 carry out the computation to produce "year-on-year TOPIX data in November 2005" and returns the produced data as a value. On the other hand, a function of "INDBS ("topix_add", "2005/11")" makes the computed-data caching treating section 44 carry out the computation to produce "seasonally adjusted value of the TOPIX data in November 2005" and stores the produced results in the computed-data caching section 122 and at the same time returns the produced results. The under bar, "", also acts as an instruction to compute the seasonal adjustment of the argument element of "topix" which is placed just ahead of the under bar. The sign of "add" just behind of the under bar shows that computation of "add" pattern is selected from various seasonally-adjusted patterns.

Next, the operational procedure of the present invention will be explained.

[1. Creation of a Time-Series Data Table and Updating Procedure of the Table]

In the present invention, the time-series data table 143b of the local database 143 is, when needed by the user of the diagram creation device 1, created and updated based on the data input by an operator or the data accumulated on the database server 2 (or database server 3). Acquisition of data is made separately on the basis of attribute information and numerical data.

Figure 6:
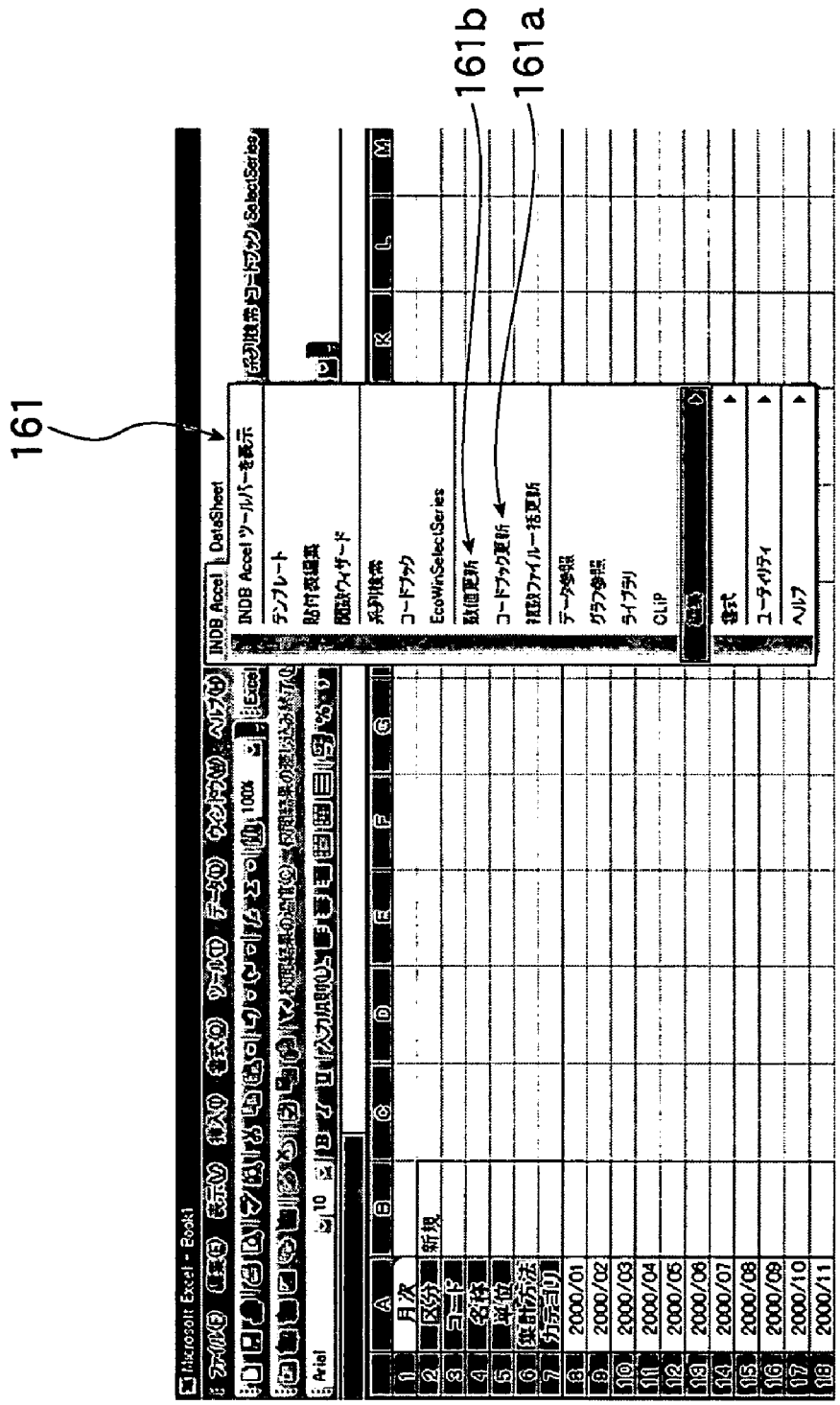
FIG. 6 is an image diagram showing a menu screen displayed on a worksheet.

At the time of acquisition and updating procedure of attribute information or numerical data, a menu screen is displayed on a display section 16 through an operation of an operation section 15. FIG. 6 is an example of an image diagram of a menu screen 161, displayed on a worksheet.

When an operator clicks a code-book update field 161a by way of the operation section 15 under a stage where a function is input into a cell of the worksheet, an external data-input control section 45 requests the database server 2 (or the database server 3) to send an attribute information based on a code specified by the function. The database server 2 (or the database server 3) sends attribute information table 20a (FIG. 2A), based on a code specified by the function, to the diagram creation device 1.

When the operator clicks a numerical value update field 161b by way of the operation section 15 under a condition where a function is input into a cell of the worksheet, the external-data input control section 45 requests a sending of a numerical data based on a code specified by the function. The database server 2 (or database server 3) sends a difference data in the numerical data table 20b (FIG. 2B), based on a code specified by the function, to the diagram creation device 1.

The diagram creation device 1 creates the time-series data table 143a on a local database 143 based on these acquired data, and the previously created table is updated (numerical data is updated based on the difference data).

[2. Detailed Procedure of the Diagram Creation]

Figure 7A:
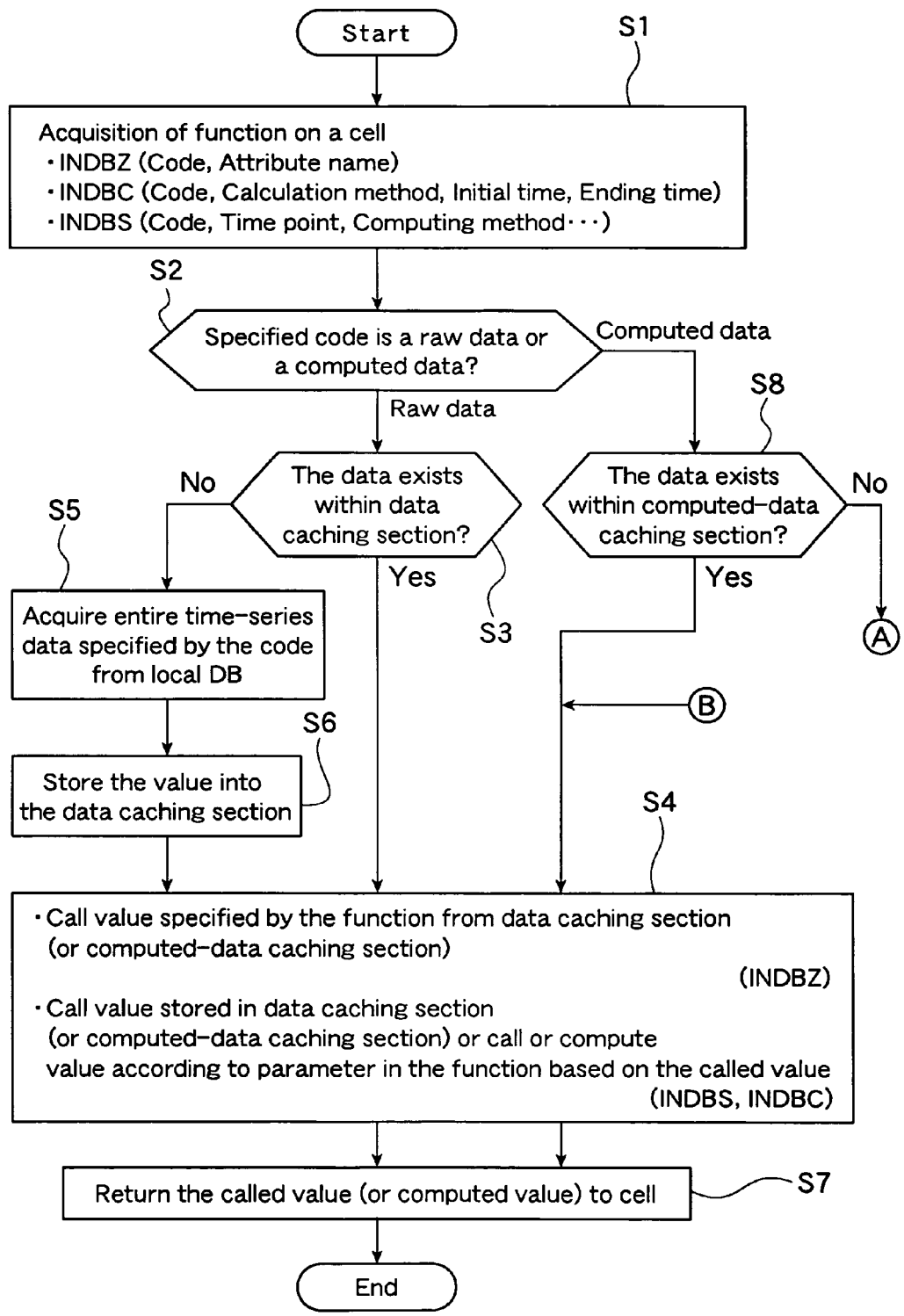
FIG. 7A is a flowchart showing the concrete operational procedures of creating diagrams of FIG. 3.
Figure 7B:
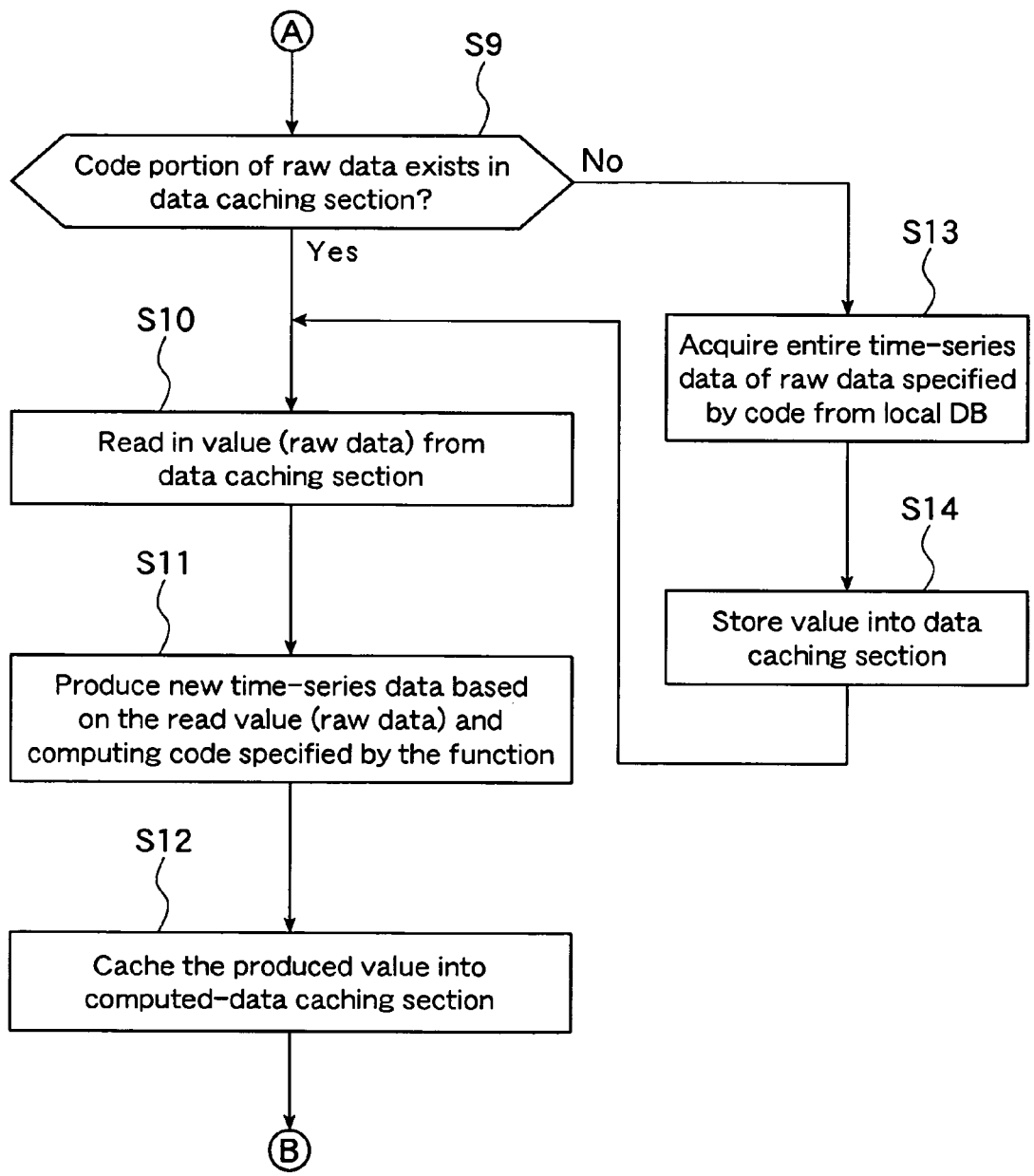
FIG. 7B is a flowchart showing the concrete operational procedures of creating diagrams of FIG. 3.

FIGS. 7A and 7B are flow charts showing a detailed procedure of diagram creation in the diagram creation device 1 of the present invention. Procedures will be explained with reference to the same Figures. In addition, main display screens will be explained with reference to Figures, too.

[2-1. Diagram Creation Procedure Based on the Attribute Acquisition Function]

Figure 8:
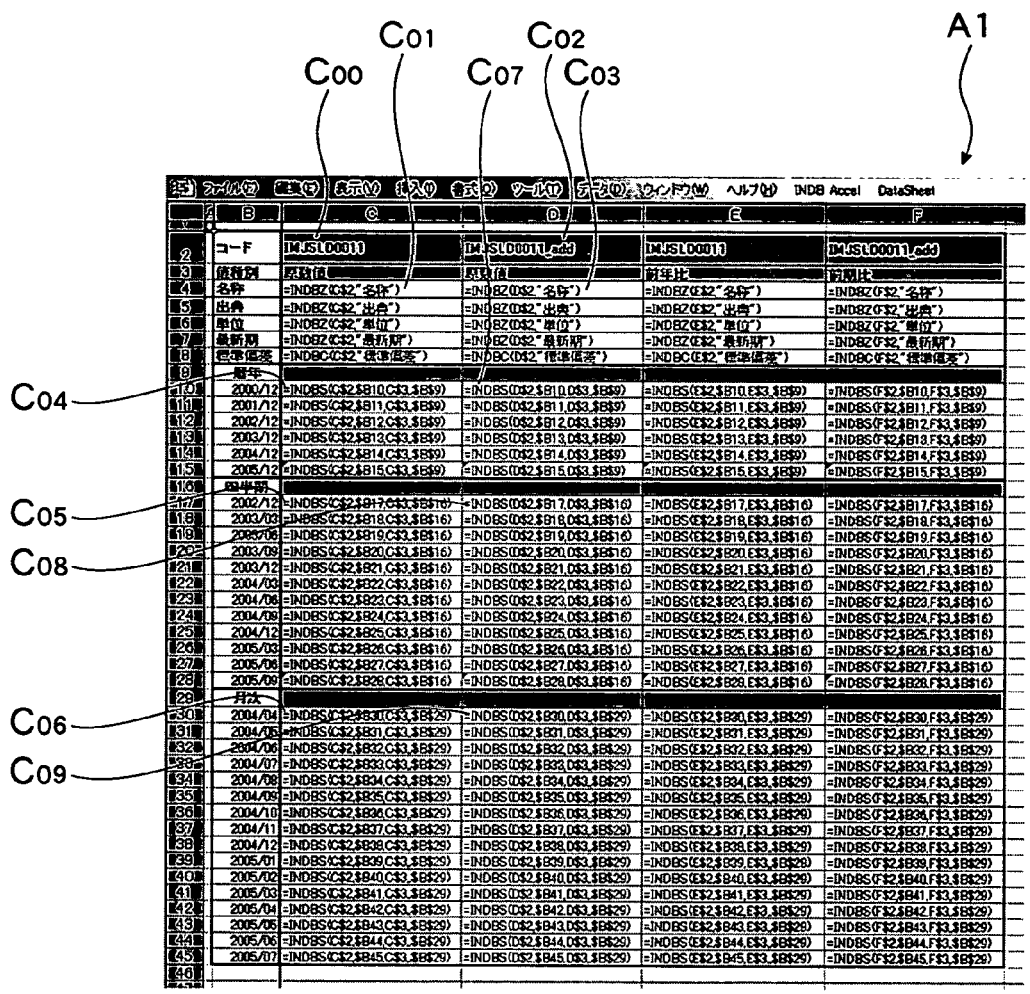
FIG. 8 is an image diagram showing a worksheet into which a function to acquire time-series data is input.

When the attribute acquisition function is input into a cell C of a worksheet A displayed on the display section 16, the function treating section 41 acquires the function (Step S1). FIG. 8 shows a state in which a function for acquiring a time-series data and the attribute information of the time-series data is input into a worksheet A1. In FIG. 8, a data code "IMJSLD0011" showing a time-series data of domestic sales of air conditioner is input into $C_{00}$ of a cell C2. And an attribute acquisition function "INDBZ (C$2, "name")" is input into $C_{01}$ of a cell C4. Similar attribute acquisition functions are input into cells C5 to C8. For example, the attribute acquisition function in $C_{01}$ of the cell C4 means an acquisition of "the name of data having a data code input into $C_{00}$ of a cell C2 (time-series data of the domestic sales of air conditioner).

The function treating section 41 acquires an argument of the obtained function and recognizes whether the code in the argument is a code of a raw data or a code of a computed data (Step S2). An attribute acquisition function input into $C_{00}$ of the cell C4 is treated as raw data because no underline is given to the first argument (functions in the cells C5 to C8 are also treated likewise).

When the code is a raw data ("raw data" in Step S2) the function treating section 41 makes the data treating section 43 confirm whether or not there is a specified value (line 121$a$1 in FIG. 4) in the data caching table 121$a$ of the data caching section 121. If the value is found ("Yes" in Step S3), the data treating section 43 calls the specified value of the function from the data caching section 121 and sends it to the function treating section 41 (Step S4) and the function treating section 41 returns the called value to the cell C (Step S7).

When the specified value specified by the function is not found in the data caching section 121 ("No" in Step S3), the data treating section 43 acquires the entire time-series data of the code specified in the argument from the local database 143 (Step S5).

The data treating section 43 stores the acquired value into the data caching section 121 (Step S6). Then the above-mentioned Steps S4 and S7 are carried out.

On the other hand, in a case where the code in the argument is a computed data ("computed data" in Step S2) (this case corresponds, for example, to $C_{03}$ in the cell D4 in FIG. 8), an attribute acquisition function "INDBZ (D$2, "name")" is input into the cell and a data code "IMJSLD0011_add" that means a seasonally adjusted value of "add" pattern of the domestic sales of air conditioner is input into $C_{02}$ of a cell D2 (similar attribute acquisition function is input into cells D5 to D8). The data treating section 43 makes the computed-data caching treating section 44 confirm whether or not there is a value specified by the function in the computed-data caching section 122. When the value is found in the computed-data caching section 122 ("Yes" in Step S8), the Steps S4 and S7 are carried out.

When the value is not found in the computed-data caching section 122 ("No" in Step S8), the data treating section 43 confirms whether or not there is a code portion of the raw data in the data caching section 121. If the value is found ("Yes" at Step S9), the data treating section 43 reads in the value (raw data) (Step S10) from the data caching section 121, and the computed-data caching treating section 44 performs processing and producing to obtain a new value (time-series data) based on the reading value (raw data) and a parameter (that is "IMJSLD0011", "" and "add") in the data code of the function (Step S11), stores the processed and produced value into the computed-data caching section 122 (Step S12). Then Step S4 and S7 are carried out.

When the code portion of the raw data is not found in the data caching section 121 ("No" at Step S9), the data treating section 43 acquires the entire time-series data of the code specified by the argument from the local database 143 (Step S13) and stores the acquired value in the data caching section 121 (Step S14). Then the Step S10, S11, S12, S4 and S7 are carried out.

When the value is returned to the cell C at Step S7, the value is displayed at the cell C. FIG. 9 shows an image diagram of the worksheet in which a completed version of the table of the domestic sales of air conditioner is displayed. This table is formed with values of functions input into each cell in FIG. 8.

As shown in FIG. 9, in a worksheet A1', "domestic sales of air conditioner on a product-by-product basis at large scale electric stores", the name of time-series data of domestic sales of air conditioner, is displayed at $C_{21}$ of the cell C3. "Domestic sales of air conditioner on a product-by-product basis at large scale electric stores_ADD", the name of time-series data of "add" pattern of seasonally adjusted-value of domestic sales of air conditioner is displayed in $C_{23}$ of the cell D4. And attribute information based on functions input into $4^{th}$ to $8^{th}$ lines of the worksheet A1 (FIG. 8) is displayed in other cells of the $4^{th}$ to $8^{th}$ lines of the worksheet A1' (FIG. 9).

[2-2. Diagram Creation Procedure Based on a Numerical Value Acquisition Function to Acquire Numerical Value at a Specific Time Point]

In the case of the numerical value acquisition function to acquire numerical value at a specific time point, similar procedure used in the attribute acquisition function can be used. Detailed procedure will be explained with reference to FIGS. 7A, 7B, 8 and 9 below. Explanation of similar procedures as explained in the "Diagram Creation Procedures Based on the Attribute Acquisition Function" will be omitted.

"INDBS (C$2, $B10, C$3, $B$9)", an acquisition function at a specific time point, is, for example, input into $C_{04}$ of the cell C10 of the worksheet A1 which is displayed on the display section 16 (see FIG. 8). This function is a function to instruct acquisition of a time-series data (domestic sales of air conditioner) input into the cell C2 during a time period input into the cell B10 (December 2000) of a value (source numerical value) input into the cell C3 on the basis of a time scale (calendar year) input into the cell B9. Similar acquisition functions are input into lines 10 to 15, 17 to 28 and 30 to 45 of columns C to F.

For example, each code (the first argument) in a function input into each cell of the column C in FIG. 8 is a code showing raw data. When the function treating section 41 acquires a function input into a cell of column C and recognizes it as the code of the raw data ("raw data" at Step S2), the data treating section 43 confirms, based on the numerical value acquisition function, whether or not there is a value specified by the function in the data caching section 121. At this stage, confirmation of whether or not the argument that represents a time scale in the function (the fourth argument in FIG. 4 or the leftmost argument of the enumerated ones in the parentheses) coincides with the time scale of the cached data is also made.

When the value is found in the data caching section 121 and the time scale is confirmed to be identical to each other (for example as is the case for the function input into $C_{06}$ of the cell C30), the value is called by the data treating section 43 (Step S4), and the function treating section 41 returns the called value to the cell as a value (Step S7).

If data capable of forming the value is found in the data caching section 121 but the time scale is different from that of the function (for example as is the case for the function input into $C_{04}$ of the cell C10 or $C_{05}$ of the cell C17), the data treating section 43 calls data capable of forming the value from the data caching section 121 and sends it to the processing and computation section 42. The processing and computation section 42 operates to change the time scale of the called data to that of the value (for example when the time-scale of the called data is described on a monthly basis and the time scale of the function is described on a calendar year basis, add operation is carried out through January to December). The function treating section 41 returns the computed results to the cell C as a value.

If no value specified by the function is found in the data caching section 121 ("No" at Step S3), the data treating section 43 acquires the entire time-series data specified by the argument from the local database 143 (Step S5). More specifically, the data treating section acquires the entire value of the time-series data table 143a shown in FIG. 4 from the local database 143. The data treating section 43 stores the acquired value onto the data caching section 121 (Step S6). Then the Steps S4 and S7 mentioned above are carried out.

On the other hand, the code (the first argument) in the function input into each cell of column D in FIG. 8, for example, is a code showing computed data. When the function treating section 41 acquires a function input into a cell of the column D and recognizes it as a code of computed data ("computed data" at Step S2), the data treating section 43 makes the computed-data caching controlling section 44 confirm whether or not there is a value specified by the function in the computed-data caching section 122. At this stage, confirmation of whether or not the argument (the fourth argument) that represents a time scale on the function coincides with the time scale of the cached data is also made.

When the value is found in the computed-data caching section 122 (Step S8) and the time scale of the computed data is found to be equal to an aimed one (for example, the function input into $C_{09}$ of the cell D30 corresponds to this case.), the value is called by the computed-data caching treating section 44 (Step S4) and the function treating section 41 returns the called value to the cell C (Step S7). When the time scale does not coincide with the aimed one (for example the function input into $C_{07}$ of the cell D10 or $C_{08}$ of the cell D17 corresponds to this case.), the data treating section 43 calls the data, from which this value is formed, from the computed data caching section 122 and sends the data to the processing and computation section 42. The processing and computation section 42 is operated to such an extent that the time scale of the called data becomes equal to that of the value. The function treating section 41 returns the computed results to the cell C as a value.

When no value specified by the function is found in the computed data caching section 122 ("No" at Step S8), the data treating section 43 confirms whether or not there is the code portion of the raw data in the data caching section 121. In other words, the data treating section 43 makes a confirmation of whether or not there is a data caching table 121a (FIG. 4) in the data caching section 121.

When the value is found ("Yes" at Step S9), the data treating section 43 reads the value (raw data) from the data caching section 121 (Step S10). In other words, a necessary value is read out from the data caching table 121a (FIG. 4) of the data caching section 121. The read-out value is passed to the computed-data caching treating section 44. The computed-data caching treating section 44 produces a new value (time-series data) based on the read-in value (raw data) and a parameter in the data code of the function (Step S11).

More specifically, for example, such computation as producing of seasonally-adjusted value of the domestic sales of air conditioner in April 2004 is produced based on an instruction of $C_{09}$ of the cell D30.

The computed-data caching treating section 44 stores the computed data in the computed-data caching section 122 (Step S12). Thus the computed-data caching table 122a shown in FIG. 5 is formed in the computed-data caching section 122. Then the Steps S4 and S7 are carried out.

When no value is found in Step S9 ("No" at Step S9) the data treating section 43 acquires entire time-series data of a code specified by the argument from the local database 143 (Step S13). More specifically, entire value of the table 143b shown in FIG. 4 is acquired from the local database 143. The acquired data is passed to the data treating section 43 and then stored in the data caching section 121 (Step S14). Then processes after Step S10 (Step S10, S11, S12, . . . ) are carried out.

When the value is returned to the cell C at Step S7, the value is displayed in the cell C (see FIG. 9). As shown in FIG. 9, in the lines 10 to 15, 17 to 28, 30 to 45 of the same worksheet A1', time-series data of source numerical value (non-adjusted value), source numerical value (seasonally-adjusted value), year-on-year growth (non-adjusted), quarter-to-quarter growth (seasonally-adjusted value) of sales are recorded on monthly, quarterly and yearly basis respectively. For example, "102,933", which is a source numerical value (non-adjusted value) of the domestic sales of air conditioner, is displayed in $C_{26}$ of the cell C30 as a value of the function input into $C_{06}$ of the cell C30 of the worksheet A1. Similarly, "2,418,334", a value of the function input into $C_{04}$ of the cell C10 of the worksheet A1 is displayed in $C_{24}$ of the cell C10, and "245,547", a value of the function input into $C_{04}$ of the cell C10 of the worksheet A1 is displayed in $C_{25}$ of the cell C17 respectively. In lines 10 to 15, 17 to 28, 30 to 45 of the column C to F, similar values are displayed as the results of the above processing.

[2-3. Diagram Creation Procedure Based on a Numerical Value Calculation Function]

In the case of numerical value calculation function, similar procedure can be used as in the numerical value acquisition function. That is, when a numerical value calculation function is input into a cell C of the worksheet A, processing is carried out based on the procedures of the Step S1 to S14, the value is returned to the cell C and the value is displayed in the cell C (diagrammatic representation of the same function is omitted).

As described above, the diagram creation device 1 of the present invention forms the data caching section 121 for caching various data on the main memory 12. At the time of acquiring data based on an instruction data input into the cell C of the worksheet A, the specified data which is requested to acquire exists within the data caching section 121, the data treating section 43 preferentially acquires the specified data in the data caching section 121. Accordingly, the number of database access to the local database 143 and the cost of CPU 11 caused by data communication with the local database 143 can be reduced, being able to shorten the response time.

In the diagram creation device 1 of the present invention, when the data treating section 43 acquires the specified data from the local database 143, the data treating section 43 acquires the specified data and the same series data of the specified data containing the predetermined information in data accumulated in the local database 143, and stores the same series data and the specified data as well in the data caching section 121. Accordingly, at the time of acquiring data which is the same series data sought to be acquired from the local database 143, the data can be acquired from the data-caching section 121. The number of database access to the local database 143 for acquiring the same series data and the cost of CPU 11 can be reduced, being able to shorten the response time.

In the diagram creation device 1 of the present invention, the processing and calculation section 42 produces a computed data by running a predetermined computation of the acquired data acquired from the local database 143. The data treating section 43 cashes the produced computed data into the computed-data caching section 122 formed on the main memory 12. The data treating section also acquires preferentially the computed data cached on the computed-data caching section 122. Therefore, the cost of CPU 11 and the time for processing data after acquiring the data from the local database 143 and returned to the cell C after a predetermined computation can be reduced. And the response time can be shortened when a function for acquiring numerical data to be produced by computation is input into the cell C of the worksheet A.

In the diagram creation device 1 of the present invention, when a specified data is a computed data and does not exist in the computed-data caching section 122 and data capable of producing a specified data exists in the data caching section 121, the data input and output treating section 43 preferentially acquires the data in the data caching section 121. Therefore, the number of database access to the local database 143 at the time of producing a computed data and the cost of CPU 11 required for communication of data with the local database 143 can be reduced. And the response time can be shortened when a function for acquiring numerical data to be produced through computation processes is input into the cell C of the worksheet A.

In the diagram creation device 1 of the present invention, both functions of the add-in section 142*a* and a normal function of the spreadsheet section 141*a* can be operable at the same time without any problem by making the instruction data to be operable on the spreadsheet software (spreadsheet section 141*a*). In addition, users, who input instructions into the cell C, can input the instruction data with ease, by writing the instruction data in the form of "function" as is the case for the normal instruction data input into the cell C of the worksheet A. Furthermore, figures and/or tables are created based on functions, therefore, styles or modes of these graphs or tables can be easily changed into another display mode by changing the argument.

In the diagram creation device 1 of the present invention, the function returns numerical data, that forms the time-series data, or attribute information of the time-series data to the cell C as a value, therefore the function of the add-in section 142*a* can be used for creation of diagram in the field of economic information, statistic information etc.

The diagram creation device 1 of the present invention has a distinguished effects especially in creation of diagram based on a large volume of data.

For example, in the case of the present embodiment where monthly data for 50 years is output in 3 series to create tables and a code in the argument represents raw data ("raw data" at Step S2), the number of database access to the local database 143 (Step S5) and the number of data caching to the data caching section 121 (Step S6) are completed each in 3 accesses and 3 cachings. On the other hand, according to the conventional method, 50 (years)×12 (month)×3 (series) =1800 times of database accesses are needed, increasing in the number of database access and the number of data communication. In other words, in the present invention, time required for database access and data communication can be reduced, being able to realize a quick response.

In the above-mentioned case, when the code in the argument is a computed data ("computed data" at Step S2), database access (Step S13), data caching (Step S14), production of a new time-series data (for example, seasonally adjusted value, Step S11) and data caching of the computed data to the computed data caching section 122 (Step S12) are performed 3 times each to create three series of table. On the other hand, according to the conventional method, 50×12×3=1800 times for each data caching and computation of new time-series data are needed, resulting in increase in the number of database access and computation of time-series data. Especially, huge amount of cost for CPU is needed for computation of the above-mentioned seasonally-adjusted value, often resulting in increase in the operation time (for example, in the above-mentioned case, 1 to 2 seconds per one value is needed for a CPU level of a commercially available personal computer). Therefore, in the present embodiment, time required for database access and data communication can be considerably reduced, being able to realize a quick response.

In the present invention, explanation is exclusively made on the 3 cases—"attribute acquisition function", "numerical calculation function" and "acquisition function to acquire numerical value at a specific time point"—, but the diagram creation device 1 can be applied for other functions.

Further, in the diagram creation device 1 of the present invention, although the data caching section 121, the computed-data caching section 122 are formed on the main memory 12, these sections can be formed on other memory means.

Furthermore, in the diagram creation device 1 of the present invention, although the function of the add-in section 142*a* can be realized by the results of operation of the add-in soft 142, the same function can also be realized by a hardware logic.

It is noted that the above-mentioned embodiment is an example of the present invention and not limited to the present embodiment.

The invention claimed is:

1. A diagram creation device, comprising:
   a database that stores a data group containing plural first spreadsheet data, each of which is used as an argument when a spreadsheet software repeats a same first function operation plural times in which each operation uses a different argument;
   a data caching memory that stores the data group read from the database;
   a command processing portion that acquires one first spreadsheet data among the plural first spreadsheet data corresponding to a first spreadsheet data transmission command and supplies the acquired one first spreadsheet data to the spreadsheet software each time the first spreadsheet data transmission command is received from the spreadsheet software; and
   a data processing portion that reads all of the plural first spreadsheet data contained in the data group from the database, stores all of the read plural first spreadsheet data to the data caching memory and supplies the requested one first spreadsheet data to the command processing portion when an acquisition request for the one first spreadsheet data is received from the command processing portion for a first time, and that reads the one first spreadsheet data from the data caching memory and supplies the read one first spreadsheet data to the command processing portion when the acquisition request for the one first spreadsheet data is received from the command processing portion for a second time and any subsequent time,
   wherein the data processing portion makes the computed data caching processing portion generate all of plural second spreadsheet data, stores all of the generated plural second spreadsheet data to the computed data caching memory and supplies one second spreadsheet data corresponding to a received acquisition request for the one second spreadsheet data to the command processing portion when the acquisition request for the one second spreadsheet data is received from the command processing portion for a first time, and reads the one second spreadsheet data from the computed data caching memory and supplies the read one second spreadsheet data to the command processing portion when the acquisition request for the one second spreadsheet data is received from the command processing portion for a second time and any subsequent time.

2. The diagram creation device according to the claim 1, wherein the data processing portion performs:
    checking whether the requested first spreadsheet data is stored in the data caching memory each time the acquisition request for the first spreadsheet data is received from the command processing portion,
    judging that the received acquisition request for the first spreadsheet data is the request of the first time when the requested first spreadsheet data is not stored in the data caching memory, and
    judging that the received acquisition request for the first spreadsheet data is the request of the second or subsequent time when the requested first spreadsheet data is stored in the data caching memory.

3. The diagram creation device according to the claim 1, further comprising:
    a computed data caching processing portion that generates second spreadsheet data by using the first spreadsheet data, in which each of the second spreadsheet data is used as an argument when a spreadsheet software repeats a same second function operation plural times with a different argument each time; and
    a computed data caching memory that stores the second spreadsheet data generated by the computed data caching processing portion,
    wherein the command processing portion acquires one second spreadsheet data corresponding to a second spreadsheet data transmission command and supplies the acquired second spreadsheet data to the spreadsheet software each time the second spreadsheet data transmission command is received from the spreadsheet software.

4. The diagram creation device according to claim 3, wherein the computed data caching processing portion performs:
    checking whether the data caching memory stores the first spreadsheet data, when the computed data caching processing portion computes the second spreadsheet data by using the first spreadsheet data, and
    reading the first spreadsheet data from the data caching memory, not from the database, when the data caching memory stores the first spreadsheet data.

5. The diagram creation device according to the claim 1, wherein the data processing portion performs:
    checking whether the requested second spreadsheet data is stored in the computed data caching memory each time the acquisition request for the second spreadsheet data is received from the command processing portion,
    judging that the received acquisition request for the second spreadsheet data is the request of the first time when the requested second spreadsheet data is not stored in the computed data caching memory, and
    judging that the received acquisition request for the second spreadsheet data is the request of the second or subsequent time when the requested second spreadsheet data is stored in the computed data caching memory.

6. The diagram creation device according to claim 1, wherein the command is generated as a function for being executed on the spreadsheet software and sent to the command processing portion.

7. The diagram creation device according to claim 6, wherein the data group to which the requested first spreadsheet data belongs is decided based on an argument of the function.

8. The diagram creation device according to claim 1, wherein the first spreadsheet data contains a numerical data or attribute information.

9. The diagram creation device according to claim 1, wherein the second spreadsheet data contains a numerical data or attribute information.

10. A computer-readable storage medium storing a program that is executed by a computer and makes the computer perform as a diagram creation device according to claim 1.

11. A diagram creation device, comprising:
    a database that stores a data group containing plural first spreadsheet data, each of which is used as an argument when a spreadsheet software repeats a same first function operation plural times in which each operation uses a different argument;
    a data caching memory that stores the data group read from the database;
    a computed data caching processing portion that generates second spreadsheet data by using the first spreadsheet data, in which each of the second spreadsheet data is used as an argument when a spreadsheet software repeats a same second function operation plural times in which each operation uses a different argument;
    a computed data caching memory that stores the second spreadsheet data generated by the computed data caching processing portion;
    a command processing portion that acquires one first or second spreadsheet data among the plural first spreadsheet data or second spreadsheet data corresponding to a first or second spreadsheet data transmission command and supplies the acquired one first or second spreadsheet data to the spreadsheet software each time the first or second spreadsheet data transmission command is received from the spreadsheet software; and
    a data processing portion that acquires the one first or second spreadsheet data requested by the command processing portion and supplies the one first or second spreadsheet data to the command processing portion,
    wherein the data processing portion reads all of the plural first spreadsheet data contained in the data group from the database, stores all of the read plural first spreadsheet data to the data caching memory and supplies the requested one first spreadsheet data to the command processing portion when an acquisition request for the one first spreadsheet data is received from the command processing portion for a first time, and reads the one first spreadsheet data from the data caching memory and supplies the read one first spreadsheet data to the command processing portion when the acquisition request for the one first spreadsheet data is received from the command processing portion for a second time and any subsequent time, and
    wherein the data processing portion makes the computed data caching processing portion to generate all of the plural second spreadsheet data, stores all of the generated plural second spreadsheet data to the computed data caching memory and supplies the one second spreadsheet data corresponding to a received acquisition request for the one second spreadsheet data to the command processing portion when the acquisition request for the one second spreadsheet data is received from the command processing portion for a first time, and reads the one second spreadsheet data from the computed data caching memory and supplies the read one second spreadsheet data to the command processing portion when the acquisition request for the one second spreadsheet data is received from the command processing portion for a second time and any subsequent time.

12. The diagram creation device according to claim 11, wherein the first and second spreadsheet transmission commands are generated as a separate function executed on the spreadsheet software and sent to the command processing portion.

13. The diagram creation device according to claim 12, wherein the first data group to which the requested first spreadsheet data belongs and the second data group to which the requested second spreadsheet data belongs are decided based on an argument of the function.

14. The diagram creation device according to claim 11, wherein the first and second spreadsheet data contain a numerical data or attribute information.

15. The diagram creation device according to the claim 11, wherein the data processing portion performs;

checking whether the first spreadsheet data used for computing the second spreadsheet data is stored in the data caching memory, when making the computed data caching processing portion compute the second spreadsheet data, reading the first spreadsheet data from the data caching memory and supplying the read first spreadsheet data to the computed data caching processing portion, when the requested first spreadsheet data is stored in the data caching memory, and reading all of the first spreadsheet data contained in the data group corresponding to the computing and supplying the read first spreadsheet data to the data caching memory, when the requested first spreadsheet data is not stored in the data caching memory.

16. A computer-readable storage medium storing a program which is executed by a computer and makes the computer perform as a diagram creation device according to claim 11.

* * * * *